United States Patent [19]

Hall, III et al.

[11] Patent Number: 4,860,613
[45] Date of Patent: Aug. 29, 1989

[54] STEER-BY-DRIVING TRANSMISSION WITH GROUND SPEED CONTROL

[75] Inventors: Arthur Hall, III, Indianapolis; Robert F. Combs, Mulberry, both of Ind.

[73] Assignee: General Motors Corporation, Detroit, Mich.

[21] Appl. No.: 284,019

[22] Filed: Dec. 14, 1988

[51] Int. Cl.$^4$ .................... F16H 47/08; F16H 47/04
[52] U.S. Cl. ................................. 74/687; 74/675; 74/677
[58] Field of Search ............ 74/675, 677, 681, 687, 74/720, 720.5; 180/6.38, 6.44, 6.7

[56] References Cited

U.S. PATENT DOCUMENTS

| | | | |
|---|---|---|---|
| 3,884,095 | 5/1975 | Miyao et al. | 74/687 |
| 4,183,264 | 1/1980 | Reed | 74/720.5 |
| 4,420,991 | 12/1983 | Meyerle | 74/677 X |
| 4,485,091 | 12/1984 | Reed | 74/687 |
| 4,569,251 | 2/1986 | Greenwood | 180/6.44 X |
| 4,614,132 | 9/1986 | Hall, III | 74/687 X |
| 4,663,987 | 5/1987 | Maruyama et al. | 74/687 |
| 4,682,515 | 7/1987 | Reed | 74/677 X |
| 4,718,299 | 1/1988 | Greenwood | 74/687 X |

Primary Examiner—Dwight G. Diehl
Attorney, Agent, or Firm—Donald F. Scherer

[57] ABSTRACT

A steer-by-driving power train has a single input dual output range transmission. The power train also has a hydraulic steering system which, during normal operation, distributes equal but opposite rotation to the output member through a reversing gear mechanism. A ground speed control transmission independent of engine speed is attained by disconnecting the steer mechanism from the reversing gear mechanism and connecting the steer system to the dual output of the range transmission and placing the gearing of the range transmission in neutral. The vehicle ground speed is controlled by controlling the displacement of the hydrostatic steer system.

1 Claim, 1 Drawing Sheet

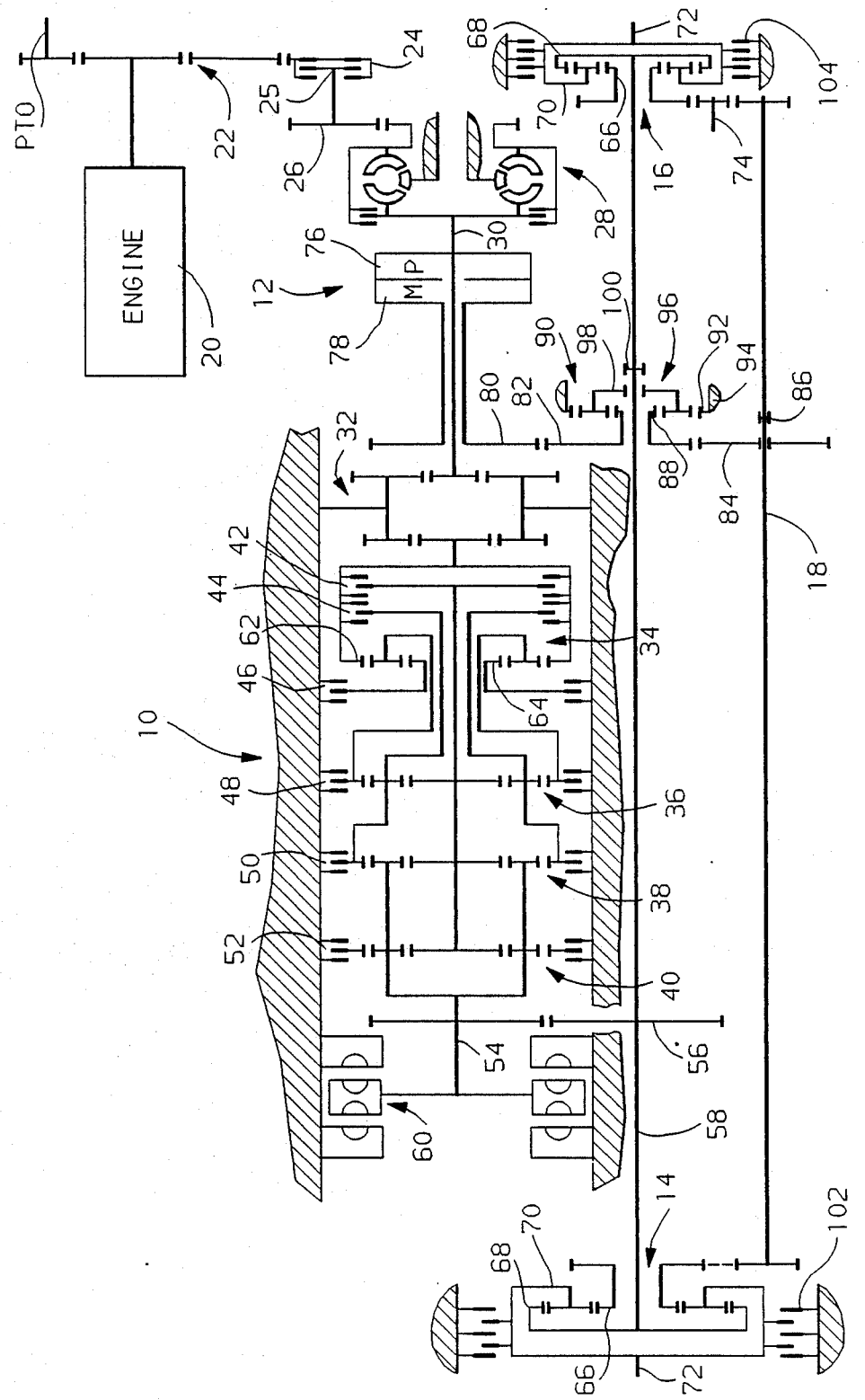

STEER-BY-DRIVING TRANSMISSION WITH GROUND SPEED CONTROL

The invention herein described was made in the course of work under a contract or subcontract thereunder with the Department of the Army.

BACKGROUND OF THE INVENTION

This invention relates to single input dual output transmissions and more particularly to such transmission having a mechanism for ground speed control independent of engine speed.

SUMMARY OF THE INVENTION

It is an object of this invention to provide an improved engine driven power transmission having a single input dual output range transmission, and a hydrostatic steer mechanism operable to provide equal and opposite rotary steering bias on a steer shaft connected to the outputs, and wherein the steer mechanism is selectively connectible with the transmission outputs and disconnectible from the steer shaft to provide a drive path to the transmission outputs that is variable in speed independent of engine speed.

This and other objects and advantages of the present invention will be more readily apparent from the following description and drawing.

DESCRIPTION OF THE DRAWING

The drawing depicts a schematic representation of a power transmission incorporating the present invention.

DESCRIPTION OF THE EMBODIMENT

The power train includes a range transmission 10, a hydrostatic steering system 12, a pair of output planetary gear arrangements 14 and 16, and a steer bias input shaft 18 which is connectible between the hydrostatic steering system 12 and the output planetary gear arrangements 14 and 16. The power train also includes an engine 20 drivingly connected through transfer gearing 22 to an input clutch 24. The output side 25 of the input clutch 24 is connected through a transfer gear 26 with a conventional torque converter and torque converter clutch, generally designated 28. The torque converter 28 is drivingly connected through a shaft 30 with the hydrostatic steering system 12 and with an input gear mechanism 32 which is connected to the range transmission 10.

The range transmission 10 includes four simple planetary gear arrangements 34, 36, 38 and 40. These planetary gear arrangements 34 through 40 are controlled through the selective actuation of a pair of input clutches 42 and 44 and selectively engageable friction brake members 46, 48, 50 and 52. The clutches 44 and 42 and the brakes 46 through 52 are selectively controlled to provide seven forward speeds and two reverse speeds in the range transmission 10.

The range transmission 10 has an output member 54 which is connected through transfer gearing 56 to an output shaft 58 which, in turn, is drivingly connected to the output planetary arrangements 14 and 16. The output shaft 54 of the range transmission 10 is also connected to a conventional hydrodynamic brake 60 which, as is well known, is utilized in decreasing the speed of a vehicle during normal operating conditions.

The range transmission 10 is similar to that disclosed in U.S. Pat. No. 4,070,927 issued to Polak Jan. 31, 1978, and assigned to the assignee of the present invention. The difference between the present range transmission and that disclosed in Polak is in the planetary gear arrangement 34. As can be seen, the planetary arrangement 34 has a ring gear 62, which is continuously driven by the transmission input, and a sun gear 64, which is selectively grounded through brake 46.

In the Polak transmission, these drive connections are opposite. That is, in Polak the sun gear is connected to be continuously driven by the input while the ring gear is selectively braked by connecting it with the transmission housing. The gearing hookup shown in the present invention, permits extra ratio coverage in the seventh speed and also provides a high speed reverse which is generally desired in track vehicles used by the military.

The planetary arrangements 14 and 16 provide output drives which are adapted to, in normal operation, provide independent rotation to the vehicle output members, such as planetary gearing, hubs and endless tracks, which are well known devices. Each of the planetary arrangements 14 and 26 has a sun gear 66, a ring gear 68 and a planet carrier assembly 70. The ring gears 68 are drivingly connected with the output shaft 58, the planetary carrier assemblies 70 are drivingly connected to power train output members 72 and the sun gears 66 are drivingly connected to the steer bias shaft 18.

The sun gear 66 of planetary arrangement 14 is driven through single mesh gearing from the shaft 18, while the sun gear 66 of gearing arrangement 16 is driven through a reverse idler 74 from the shaft 18. Therefore, whenever shaft 18 is rotated, the sun gears 66 receive equal but opposite rotation. As is well known, this will cause the increased output speed at one output 72 and decreased output speed at the other output 72 which in a track laying vehicle results in a turning or steering maneuver.

The hydrostatic steering system 12 is a substantially conventional mechanism including a pump 76 and a motor 78. The pump is a variable displacement hydraulic unit continuously driven by the shaft 30 whenever the clutch 24 is engaged. The motor 78 is generally a fixed displacement hydraulic unit which is driven by hydraulic fluid from the pump 76 whenever the displacement thereof is controlled at a value other than zero and the shaft 30 is rotated. As is well known, the controlling of displacement of pump 76 can control the speed of motor 78 independently of the speed of the driving shaft. The displacement of pump 76 can be controlled by many of the well known devices currently available for controlling such pump members. These devices generally use a servo control mechanism having a mechanical, electrical or hydraulic input member which is movable as a direct result of operator control or through a predetermined control sequence initiated by the operator.

The motor 78 has drivingly connected thereto a gear member 80 which, in turn, meshes with a gear member 82 rotatably supported on the output shaft 58. The gear 82 meshes with a gear 84 which is rotatably supported on the shaft 18. A clutch member 86 is drivingly connected with the shaft 18 and is selectively engageable with the gear 84 to establish a driven connection therebetween. Thus, when the clutch 86 is engaged, the shaft 18 is rotated whenever the hydraulic motor 78 is operated to rotate the gear 80.

The gear 82 has drivingly connected therewith a sun gear 88 which is a component in a planetary gear arrangement 90. The gear arrangement 90 also includes a ring gear 92 continuously connected with a stationary housing component 94 and a planet carrier assembly 96 which has a hub 98 thereof rotatably channeled on the shaft 58.

A clutch 100 is drivingly connected with the shaft 58 and selectively engageable with the hub 98 of carrier 96. Whenever the clutch 100 is engaged with the hub 98, the output shaft 58 is driven by the rotary output of the hydraulic motor 78. The clutches 86 and 100 are independently engageable and preferably never engaged simultaneously. The clutches 86 and 100 are of conventional design and may be of either a mechanical toothed engagement type or frictional engagement type. The control of these clutches 86 and 100 is achieved by conventional controls, such as mechanical, hydraulic, pneumatic or electrical mechanisms.

When the clutch 100 is engaged, the output 72 of the transmission are driven at a speed proportional to the rotary speed of motor 78. As is well known and previously mentioned, the rotary speed of motor 78 can be controlled independent of the speed of engine 20. Under some circumstances, it is desirable to provide a substantially fixed or constant ground speed for a vehicle while a working tool, such as a trencher is driven at variable speeds by the engine.

The power train disclosed herein will provide that function. To drive the accessories, a power take-off (PTO) is drivingly connected with the engine 20. The PTO, as is well known, may be continuously driven or selectively connectible with the engine through a clutch arrangement. In either event, with the present invention, the vehicle can be operated at a constant speed as determined by the hydraulic steer system 12 while the PTO can be driven at the speed proportional to the speed of engine 20 which, of course, can be increased or decreased to vary the speed of the PTO.

When the clutch 100 is engaged and the clutch 86 is disengaged, the range transmission 10 is placed in the neutral condition. That is all of the clutches and brakes therein are disengaged so that there is no torque transmitted through the transfer gearing 56 to the shaft 58. During the use of the ground speed control system, that is, hydrostatic steer system 12, clutch 100 and planetary carrier arrangement 90, shaft 18 and the gearing connected thereto provide a reaction member for the output planetary arrangements 14 and 16.

The vehicle has a pair of output brakes 102 and 104 which are supplied with modulated pressure to control vehicle stoppage. During ground speed control operation, steering can be accomplished by modulating pressure to one or the other of the output brakes 102 and 104 depending upon the direction of the turn.

The embodiments of the invention in which an exclusive property or privilege is claimed are defined as follows:

1. An improvement in single input, dual output transmissions having a pair of planetary gear output units, a range gear unit selectively connectible with the input and including an output means drivingly connected with both of the planetary gear output units for delivering an input rotation thereto, a hydraulic steer mechanism including a variable ratio hydraulic drive unit and a gearing unit and a steer shaft drivingly connected with both of the planetary gear output units in a manner to impose equal and opposite forces on the planetary output gear units, the ratio of said variable drive unit being established by an operator; said improvement comprising means for selectively connecting said variable ratio drive unit with said steer shaft; and means for selectively connecting said variable ratio hydraulic drive unit with said output means for connecting the variable ratio drive unit to drive said planetary gear output units at a speed proportional to the ratio established by the operator in the variable ratio hydraulic drive unit and said steer shaft connections establishing a reaction in each said planetary gear output unit.

* * * * *